July 31, 1962  A. V. PETREN  3,046,729
SUPERSONIC AIR INLET FOR JET AIRCRAFT HAVING
ANGLE-OF-ATTACK AND SIDE-SLIP CONTROL
Filed Jan. 18, 1960  2 Sheets-Sheet 1

INVENTOR.
ANATOLY V. PETREN
BY
R. E. Geangue
ATTORNEY.

July 31, 1962 A. V. PETREN 3,046,729
SUPERSONIC AIR INLET FOR JET AIRCRAFT HAVING
ANGLE-OF-ATTACK AND SIDE-SLIP CONTROL
Filed Jan. 18, 1960 2 Sheets-Sheet 2
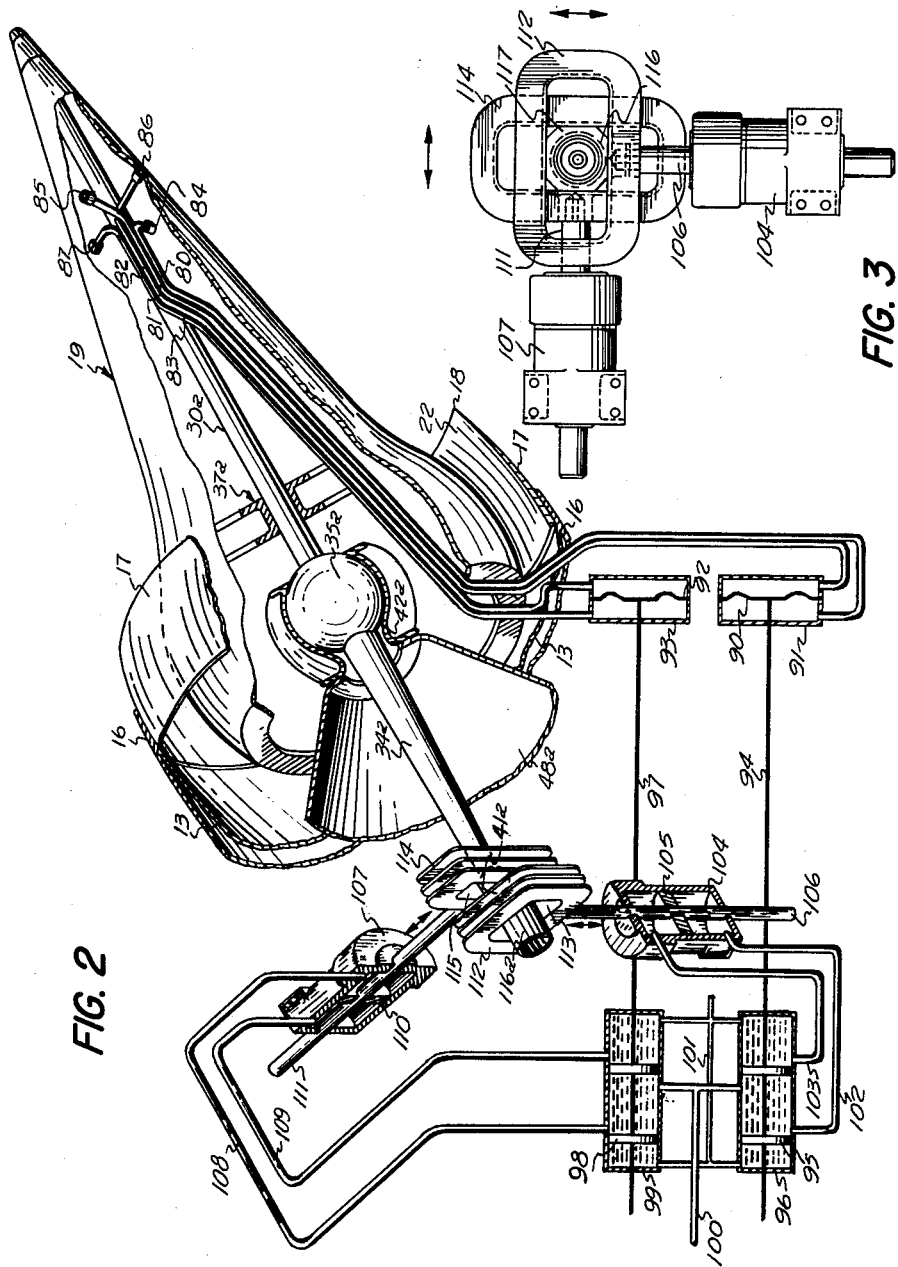
INVENTOR.
ANATOLY V. PETREN
BY
R. E. Geauque
ATTORNEY.

3,046,729
SUPERSONIC AIR INLET FOR JET AIRCRAFT HAVING ANGLE-OF-ATTACK AND SIDE-SLIP CONTROL
Anatoly Victor Petren, Canoga Park, Calif., assignor to The Marquardt Corporation, Van Nuys, Calif., a corporation of California
Filed Jan. 18, 1960, Ser. No. 3,036
2 Claims. (Cl. 60—35.6)

This invention relates to a supersonic air inlet for jet engines having angle-of-attack and side-slip control and more particularly, relates to a supersonic inlet having automatic compensation for changes in angle-of-attack and side-slip by always presenting substantially the same inlet configuration to the free stream air flow.

Angle-of-attack and side-slip variations have presented serious problems in jet engines, such as ramjets and turbojets, because of the rapid decrease in engine performance as these values increase. A fixed inlet, such as a supersonic conical or isentropic inlet, suffers from the disadvantage that at the required operational angles-of-attack and side-slip, there may be large differences in the shock strength on the opposite sides of the spike. Such a condition will obviously result in large losses in overall pressure recovery.

An angle-of-attack control is described in U.S. Patent 2,776,806 wherein a movable wedge-type diffuser has a wedge movable only in the vertical plane to provide partial angle-of-attack control. Since the movement of the wedge is limited to one plane, the movable wedge can compensate for only vertical angles-of-attack. There has been no attempt to compensate for the side-slip problem which can be just as serious as the problem resulting from angle-of-attack operation. Further, no attempt has been made in the wedge-type diffuser to move the inlet lip with the wedge. Therefore, as the wedge moves, a different inlet geometry is presented to the airstream resulting in loss of efficiency.

The present invention allows for movement of the inlet spike in both the vertical and horizontal directions so that any angle-of-attack and/or side-slip can be corrected for. In addition, the inlet of the present invention has an inlet lip which is attached to and moves with the spike. Thus, the spike and inlet lip present a constant inlet geometry to the airstream. The control system for moving the spike comprises one actuator for moving the spike in the horizontal plane to adjust for side-slip and a second actuator for moving the spike in the vertical plane to adjust for angle-of-attack. By the inner action of the two actuators, the axis of the spike can be located at any position within a cone about the engine axis so that the spike can be moved to keep both the angle-of-attack and side-slip near zero and to present the same inlet configuration regardless of angle-of-attack and side-slip variations.

It is therefore the object of the present invention to provide a supersonic air inlet for jet engines which will automatically provide shock stability and high pressure recovery under varying relative angles with the airstream.

Another object of the invention is to provide a supersonic air inlet having a spike which is movable in both the vertical and horizontal directions to any desired angle with the axis of the engine in order to maintain the angle-of-attack and side-slip near zero.

A further object of the invention is to provide a supersonic air inlet having a movable spike to compensate for angle-of-attack and side-slip and having an inlet lip movable with the spike to always present the same inlet configuration to the free stream air flow.

These and other objects of the invention not specifically set forth above will become readily apparent from the accompanying description and drawings, in which;

FIGURE 2 is a schematic illustration of the diffuser of FIGURE 1 showing the control system and actuators for the diffuser spike, and FIGURE 3 is a partial sectional view along lines 3—3 of FIGURE 1 showing the actuators for moving the spike.

Figure 1:
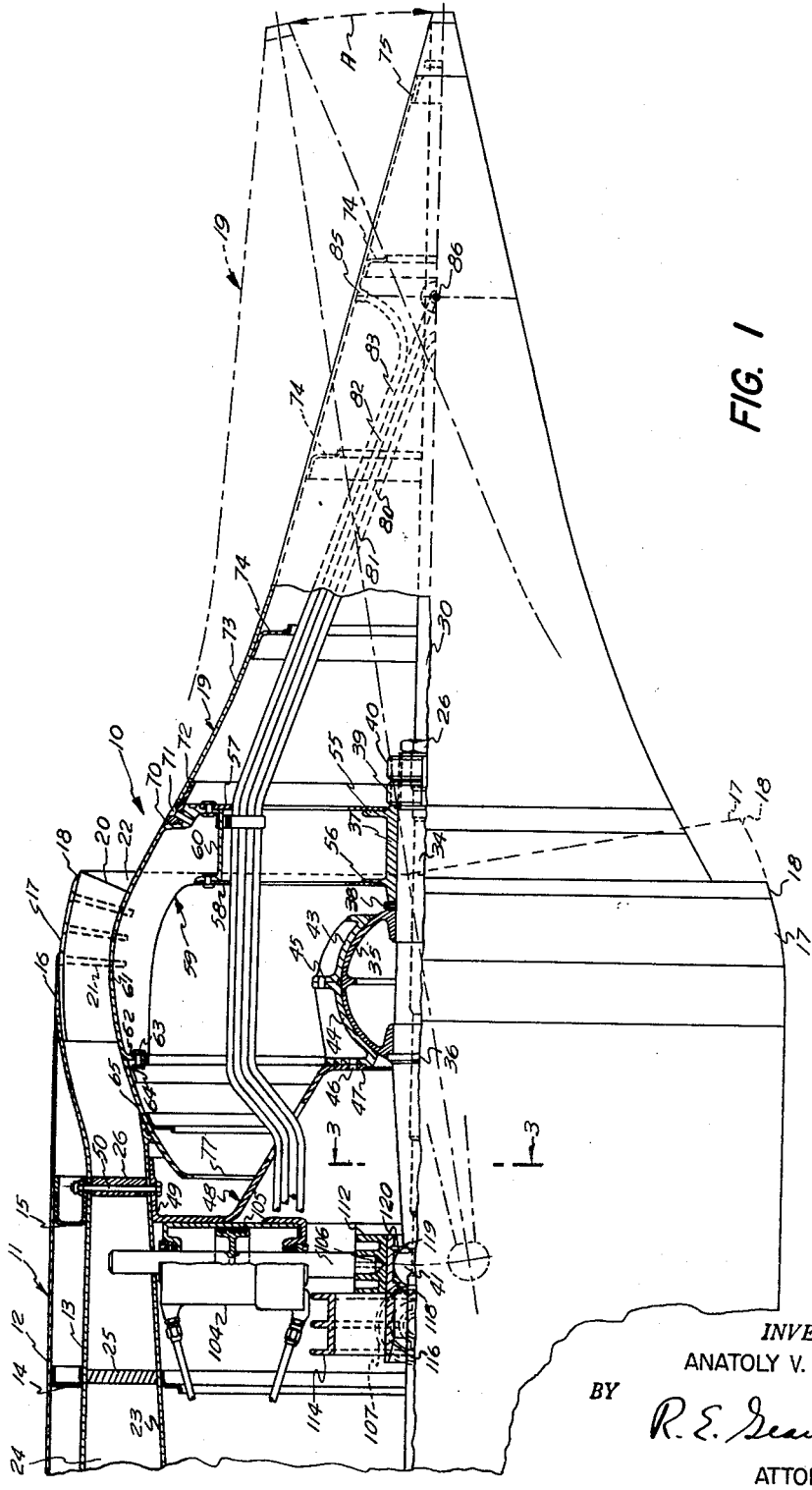
FIGURE 1 is a side elevational view, partly in section, of a isentropic inlet diffuser showing the mounting for the movable spike.

Referring to FIGURE 1, the embodiment of the invention chosen for illustration comprises a supersonic isentropic inlet 10 for a jet engine 11. The jet engine has an outer cylindrical cover 12 and an inner annular surface 13 held in fixed space relationship with surface 12 by means of structural elements, such as 14 and 15, spaced along the axis of the engine. At the forward end of the engine, the cover 12 and surface 13 converge together to form a common end 16 at the entrance to the engine.

A movable cowl member 17 has an inlet lip 18 and has the same curvature as the surface 13 at end 16 for movement within surface 13. A spike 19 has a portion of its aft end located within the member 17 and a plurality of pylons 20, each secured by a plurality of bolts 21, serve to hold the member 17 in fixed, spaced relationship with the spike 19 in order to define an inlet opening 22 between the spike surface and the diffuser lip 18. A fixed diffuser inner body 23 receives the base of the spike 19 at one end and extends into the engine 11 in the well-known manner to define, with surface 13, a diffuser section 24 where velocity pressure is converted to static pressure. Spacers, such as 25 and 26, are utilized to support the diffuser inner body 23 within the engine.

The spike 19 contains a central shaft 30 extending to the forward end of the spike and one end of shaft 30 is threaded into one end of hollow shaft extension 34, the lock nut 35 serving to secure the shaft and shaft extension together. The shaft extension 34 passes through a ball 35 and has a projection 36 engaging one side of the ball. A cylinder 37 surrounds the shaft extension 34 on the opposite side of the ball 35 and is separated from the ball by a spring spacer 38. Cylinder 37 is forced against the spacer by nut 39 threaded to shaft extension 34, and lock nut 40 locks the ball 35 and cylinder 37 upon the shaft extension 34. The end of the extension 34 terminates in a ball 41 which is movable by the control system in a manner later to be described.

A split socket 42 is formed from ribbed sections 43 and 44 which are secured together by pins 45. Also, the section 44 is secured by pins 46 to one end 47 of a stationary frame 48. The other end 49 of the frame is rigidly secured to the diffuser inner body 23 and to the engine surface 13 by a plurality of bolts 50 passing through the spacers 26. Thus, the frame 48 rigidly supports the socket 42 which contains the ball 35 and both the socket and ball are located at the centerline of spike 19 and at the entrance portion of the engine.

The cylinder 37 has flanges 55 and 56 which support plates 57 and 58, respectively. A ribbed, annular structural member 59 has a U-shaped section 60, the legs of which are secured to plates 57 and 58. Also, the surface 61 of the structural member 59 forms a portion of the movable spike surface and an angular flange 62 at one end is secured by pin 63 to an angular member 64 which supports a surface section 65 of the spike. One end of section 65 projects into the inner body 23 and is movable relative thereto. The other end of surface 61 terminates at an angular fitting 70 secured to frame member 59 by pins 71. The fitting 70 has an extension 72 which receives one end of a spike surface 73 and the spike surface is strengthened by a plurality of members 74 spaced along its length. A cap member 75 has an extension 76 inserted into the other end of surface 73 and member 75 covers the nose portion of the spike. It is therefore apparent that the surfaces 61, 65, 73 and 75 form an isentropic spike surface which is supported by shaft 30 and shaft extension 34, and that the ball 35 carried by the shaft extension 34 is located within a stationary socket 45 to permit angular movement of the spike 19 with respect to the axis of the engine to any position within the cone of maximum movement. The clearance between the edge 77 of surface section 65 and frame 48 is sufficient to permit cocking of the spike by the desired angular amount within the cone of movement permitted by the socket construction. Since the cowl member 17 is rigidly secured to and moves with the spike, the lip 18 maintains a fixed relationship to the spike surface and therefore, the same inlet configuration is presented to the free stream air flow at all positions of the spike.

Referring to FIGURE 2, the structure of the inlet is illustrated schematically and comprises a frame 48a supporting a socket 42a for receiving a ball 35a which is connected with a shaft extension 34a carrying a smaller ball 41a. The shaft 30a is shown schematically supporting the cylinder 37a by which the isentropic surface of the spike 19 is supported. Also, the movable cowl member 17 is shown positioned within the end 16 of the engine with the lip 18 separated from the surface of the spike to form the inlet opening 22.

As illustrated in FIGURES 1 and 2, four control lines 80, 81, 82 and 83 extend through the interior of the spike 19 and have pressure taps 84, 85, 86 and 87, respectively, located at the same station in the forward spike surface. The taps 84 and 85 are in the vertical plane on opposite sides of the spike and communicate through lines 80 and 81 to opposite sides of a diaphragm 90 in an error signal sensor 91. The taps 86 and 87 are in the horizontal plane on opposite sides of the spike and are connected through lines 82 and 83 to opposite sides of a diaphragm 92 in error signal sensor 93. Diaphragms 90 and 92 respond to the pressure differences which occur on opposite sides on the spike when the spike is not directly in line with the free stream air flow. Movement of the diaphragm 90 is transmitted through shaft 94 to hydraulic selector valve 95 in casing 96, while movement of diaphragm 92 is transmitted through shaft 97 to hydraulic selector valve 98 in casing 99. Hydraulic fluid under pressure is supplied to both casings 96 and 99 by passage 100 and the exhaust of hydraulic fluid from opposite ends of each casing is through passage 101. Also, the casing 96 is connected by lines 102 and 103 to opposite ends of cylinder 104 which contains piston 105 connected to piston rod 106. In a like manner, the casing 99 is connected to opposite ends of a cylinder 107 through lines 108 and 109 and the cylinder 107 contains a piston 110 secured to a piston rod 111.

Piston rod 106 is positioned to move in a vertical direction and one end of the rod is connected to a frame 112 containing a rectangular opening 113 having its longer dimension in the horiontal direction. The piston rod 111 of cylinder 107 moves in a horiontal direction and is connected at one end to a frame 114 which contains a rectangular opening 115 having its longer dimension in the vertical direction. A sleeve 116a has the same exterior diameter as the smaller dimension of openings 113 and 115 and has a socket at one end for receiving the ball 41a. It is therefore apparent that movement of the sleeve 116a by the frames 112 and 114 will move the ball 41a and shaft extension 34a in order to change the angle of the spike 19 by moving the spike in the opposite direction. Movement of the piston rod 106 will change the angle of the spike in the vertical direction while the sleeve 116a simply slides in the opening 114, while piston rod 111 will change the angle of the spike in a horizontal direction while the sleeve 116a slides in the opening 113 of frame 112.

Because of the actuation of the spike by the two frames 112 and 114, it is apparent that the spike can be positioned at any location within a maximum cone permitted by the socket structure in order to compensate for any angle-of-attack and side-slip. The positions of the valves 95 and 98 depend upon the relationship between the axis of the spike and the free stream air flow. If these are in line, the hydraulic selector valves will be in neutral position preventing flow of hydraulic fluid to or from cylinders 104 and 107. If the axis of the spike and the free stream air flow are not in line, a difference in pressure will exist over the surface of the spike and this difference is sensed by the pressure taps to actuate the valves and apply a movement of the spike in either the horizontal or vertical direction or both in order to eliminate the pressure difference. When the spike and inlet lip are properly positioned, the error signal disappears and the control system is static until a new airstream angle is encountered. In other words, as the spike moves to a new angle-of-attack and side-slip position, the differential pressure at the pressure taps on the spike decreases until finally it is completely cancelled. The spike is then in line with the airstream and the hydraulic selector valves are in the neutral position.

The physical form of sleeve 116a of FIGURE 2 is illustrated in FIGURES 1 and 3 as sleeve 116 which has four separate flat surfaces 117, two of which engage the interior of frame 112 and two of which engage the interior of frame 114. The interior of sleeve 116 has a stop 118, and a socket 119 for ball 41 is held against stop 118 by ring 120. Thus, the ball 41 can move in the socket relative to sleeve 116 and the sleeve 116 can move axially within the openings in the frames 112 and 114.

The present invention provides a supersonic air inlet having a spike which can be moved at an angle to the axis of the inlet to maintain the angle-of-attack and side-slip close to zero. In the phantom line portion of FIGURE 1, the spike 19 has been moved to the maximum amount in the vertical upward position as determined by angle A and the diffuser lip 18 has moved with the spike so that the lower portion has moved out of the end 16 of the engine while the upper portion has moved into the end 16. In the straight ahead position of the spike, the end 16 covers approximately one-half the surface of cowl member 17 and any permitted movement of the spike will not move the member 17 completely out of the end 16. Thus, at all angles of the spike, the same inlet configuration of spike and diffuser lip is presented to the free stream air flow. The ball 35 is located centrally of the cowl member 17 on the engine axis so that the cowl member moves in an arc about the ball. It is understood that the invention is applicable to various spike-type inlets, such as conical and isentropic inlets, and that various types of control systems and actuators can be utilized. Various other modifications are contemplated by those skilled in the art without departing from the spirit and scope of the invention as hereinafter defined by the appended claims.

What is claimed is:

1. A supersonic air inlet for jet engines comprising an inlet spike open at its base, a cowl member surrounding a portion of the base of said spike, the forward edge of said cowl member forming the lip of said air inlet, means for holding said cowl member in fixed relationship with said spike for movement therewith and to provide an inlet air opening to said engine, a socket located centrally of said cowl member within said spike, means extending through said open base for rigidly supporting said socket by said engine and independently of said spike, a ball located within said socket, means connecting said ball with said spike for supporting said spike for movement to any angle within a cone about the engine axis, a first pair of pressure taps on the upper and lower surfaces, respectively, of said spike, a second pair of pressure taps on opposite side surfaces of said spike, first means operative upon said ball and responsive to the pressure differences between said first pair of taps for positioning said spike and cowl member in the vertical plane, second means operative upon said ball and responsive to the pressure difference between said second pair of taps for positioning said spike and cowl member in the horizontal plane, said spike continually assuming a position to maintain the angle-of-attack and side-slip substantially zero, said first and second positioning means comprising a shaft connected with said ball and extending rearwardly thereof, said shaft extension terminating in a second ball and socket connection, a sleeve containing said connection at one end thereof, each of said positioning means including a frame receiving said sleeve in a rectangular opening with one dimension the same size as the sleeve and the other dimension larger than the sleeve, the larger dimension of said first positioning means being in the horizontal direction and of said second positioning means being in the vertical direction.

2. A supersonic air inlet for jet engines comprising an inlet spike open at its base, a cowl member surrounding a portion of the base of said spike, the forward edge of said cowl member forming the lip of said air inlet, means for holding said cowl member in fixed relationship with said spike for movement therewith and to provide an inlet air opening to said engine, a socket located centrally of said cowl member within said spike, means extending through said open base for rigidly supporting said socket by said engine and independently of said spike, a ball located within said socket, means connecting said ball with said spike for supporting said spike for movement to any angle within a cone about the engine axis, a first pair of pressure taps on the upper and lower surfaces, respectively, of said spike, a second pair of pressure taps on opposite side surfaces of said spike, first means operative upon said ball and responsive to the pressure difference between said first pair of taps for positioning said spike and cowl member in the vertical plane, second means operative upon said ball and responsive to the pressure difference between said second pair of taps for positioning said spike and cowl member in the horizontal plane, said spike continually assuming a position to maintain the angle-of-attack and side-slip substantially zero, said first and second means comprising an actuating arm means connected with said ball and extending rearwardly thereof and a pair of frames spaced apart along said actuating arm, each frame having a rectangular shaped opening for receiving a portion of said actuating arm means, the rectangular opening of one frame having a vertical dimension substantially the same size as the received portion of said actuating arm means and a horizontal dimension larger than said received portion, and the rectangular opening of the other frame having a horizontal dimension substantially the same size as the received portion of said actuating arm means and a vertical dimension larger than said received portion.

References Cited in the file of this patent

UNITED STATES PATENTS

| | | |
|---|---|---|
| 2,776,806 | Brendal | Jan. 8, 1957 |
| 2,932,945 | Brandt | Apr. 19, 1960 |